United States Patent
Cypher et al.

(10) Patent No.: US 9,268,710 B1
(45) Date of Patent: Feb. 23, 2016

(54) FACILITATING EFFICIENT TRANSACTIONAL MEMORY AND ATOMIC OPERATIONS VIA CACHE LINE MARKING

(75) Inventors: Robert E. Cypher, Saratoga, CA (US); Shailender Chaudhry, San Francisco, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 721 days.

(21) Appl. No.: 11/655,569

(22) Filed: Jan. 18, 2007

(51) Int. Cl.
*G06F 12/00* (2006.01)
*G06F 12/12* (2006.01)
*G06F 9/30* (2006.01)

(52) U.S. Cl.
CPC ............ *G06F 12/126* (2013.01); *G06F 9/3009* (2013.01)

(58) Field of Classification Search
None
See application file for complete search history.

(56) References Cited

U.S. PATENT DOCUMENTS

2004/0187123 A1\* 9/2004 Tremblay et al. ............. 718/100
2007/0240158 A1\* 10/2007 Chaudhry et al. ............ 718/102

\* cited by examiner

*Primary Examiner* — Midys Rojas
(74) *Attorney, Agent, or Firm* — Park, Vaughan, Fleming & Dowler LLP; Anthony P. Jones

(57) ABSTRACT

One embodiment of the present invention provides a system that facilitates efficient transactional execution. The system starts by executing a transaction for a thread, wherein executing the transaction involves placing load-marks on cache lines which are loaded during the transaction and placing store-marks on cache lines which are stored to during the transaction. Upon completing the transaction, the system releases the load-marks and the store-marks from the cache lines which were load-marked and store-marked during the transaction. Note that during the transaction, the load-marks and store-marks prevent interfering accesses from other threads to the cache lines.

20 Claims, 12 Drawing Sheets

FACILITATING EFFICIENT TRANSACTIONAL MEMORY AND ATOMIC OPERATIONS VIA CACHE LINE MARKING

BACKGROUND

1. Field of the Invention

The present invention relates to the design of computer systems. More specifically, the present invention relates to a technique that facilitates efficient transactional memory and atomic operations through cache line marking.

2. Related Art

Modern computer systems typically allow several threads to access shared memory simultaneously. Because these threads can potentially perform interfering memory accesses, processor designers have devised mechanisms to ensure that different threads do not interfere with each other while accessing shared memory. For example, atomic operations and transactional execution mechanisms have been developed to ensure that memory locations which are accessed by one thread are protected from accesses by other threads (or in the case of transactional memory, if such interfering accesses occur, an associated transaction fails).

A typical atomic operation is a "read-modify-write" operation which reads a value from a memory location, modifies the value that was read, and writes the modified value back to the memory location. During a read-modify-write operation, a memory location is both read from and written to, and both the read and write must occur without another thread storing to the memory location. To ensure this lack of interference, processors typically first flush pending stores from the processor's store queue and then perform the read-modify-write operation on a cache line containing the memory location. Hence, during the read-modify-write operation, other threads are prevented from gaining access to the cache line.

During transactional execution, a thread executes a special section of code which is designated as "transactional" under the condition that the memory locations accessed by the special section of code must not be interfered with by other threads while the transaction is executing. If such a memory location is interfered with by another thread, the transaction aborts and the transaction is re-executed. For a more detailed explanation of transactional execution, see "*Transactional Memory: Architectural Support for Lock-Free Data Structures*", M. Herlihy and E. Moss, in Proc. 20th Intl. Symp. on Computer Architecture, May 1993, and see "*LogTM: Log-Based Transactional Memory*", K. Moore, J. Bobba, M. Moravan, M. Hill and D. Wood, in Proc. 12th Symp. on High-Performance Computer Architecture, February 2006. In addition, see U.S. Pat. No. 6,862,664, entitled "Method and Apparatus for Avoiding Locks by Speculatively Executing Critical Sections" by inventors Shailender Chaudhry, Marc Tremblay and Quinn A. Jacobson.

Unfortunately, both transactional execution and atomic operations can be costly to implement. Transactional execution requires dedicated hardware structures to detect and handle interfering data accesses, while atomic instructions require a thread's store queue to be drained every time an atomic instruction is encountered.

Hence, what is needed is a method for facilitating transactional memory and atomic operations without the above-described problems.

SUMMARY

One embodiment of the present invention provides a system that facilitates efficient transactional execution. The system starts by executing a transaction for a thread, wherein executing the transaction involves placing load-marks on cache lines which are loaded during the transaction and placing store-marks on cache lines which are stored to during the transaction. Upon completing the transaction, the system releases the load-marks and the store-marks from the cache lines which were load-marked and store-marked during the transaction. Note that during the transaction, the load-marks and store-marks prevent interfering accesses from other threads to the cache lines.

In a variation on this embodiment, a transaction can include a section of code, an atomic instruction, or an episode of hardware speculative execution.

In a variation on this embodiment, the system executes the transaction by allowing a thread to speculatively execute a critical section of code within a program. (Note that the term "critical section" as used in this specification refers to the code executed during a transaction.) If the thread completes the critical section without encountering an interfering data access from another process, the system commits changes made during the speculative execution and resumes normal non-speculative execution of the program past the critical section. Otherwise, if an interfering data access from another thread is encountered during execution of the critical section, the system discards changes made during the speculative execution and attempts to re-execute the critical section zero or more times.

In a variation on this embodiment, the system gates a store queue for the thread while executing the transaction, so that the store queue does not send out stores generated during the transaction.

In a variation on this embodiment, the system commits store queue entries generated during the transaction to memory when the transaction is complete.

In a variation on this embodiment, prior to allowing the thread to speculatively execute the critical section, the system performs a checkpointing operation to checkpoint register values and other state information associated with the thread.

In a variation on this embodiment, the system aborts the transaction if the load-mark or store-mark cannot be placed on the cache line during the transaction.

In a variation on this embodiment, when completing the transaction, the system determines whether or not all load and store operations which precede the transaction have either completed or have load-marked or store-marked their corresponding cache line. The system aborts the transaction if the preceding load and store operations have not either completed or load-marked or store-marked their corresponding cache line.

In a variation on this embodiment, the system aborts the transaction by: (1) releasing load-marks and store-marks from cache lines; (2) removing store queue entries generated during the transaction; and (3) restoring a pre-transactional state from the checkpoint generated as the transaction commenced.

In a variation on this embodiment, when a cache line is load-marked, no other thread may store a value in the cache line and when a cache line is store-marked, no other thread may load or store a value in the cache line.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a memory system which facilitates performing load and store operations out of program order. To accomplish this without violating a conventional memory model such as Sequential Consistency (SC) or Total-Store-Order (TSO), the present invention adds a load-mark and a store-mark in metadata corresponding to each cache line, wherein the load-mark and the store-mark can be propagated to all levels of the memory hierarchy, including all caches and main memory. When a cache line is load-marked by a thread, no other threads are permitted to store values to the cache line. On the other hand, when a cache line is store-marked by a thread, no other threads are permitted to load the value from or store a value to the cache line.

Embodiments of the present invention provide a system that uses both load-marks and store-marks to facilitate the execution of transactions.

Computer System

Figure 1:
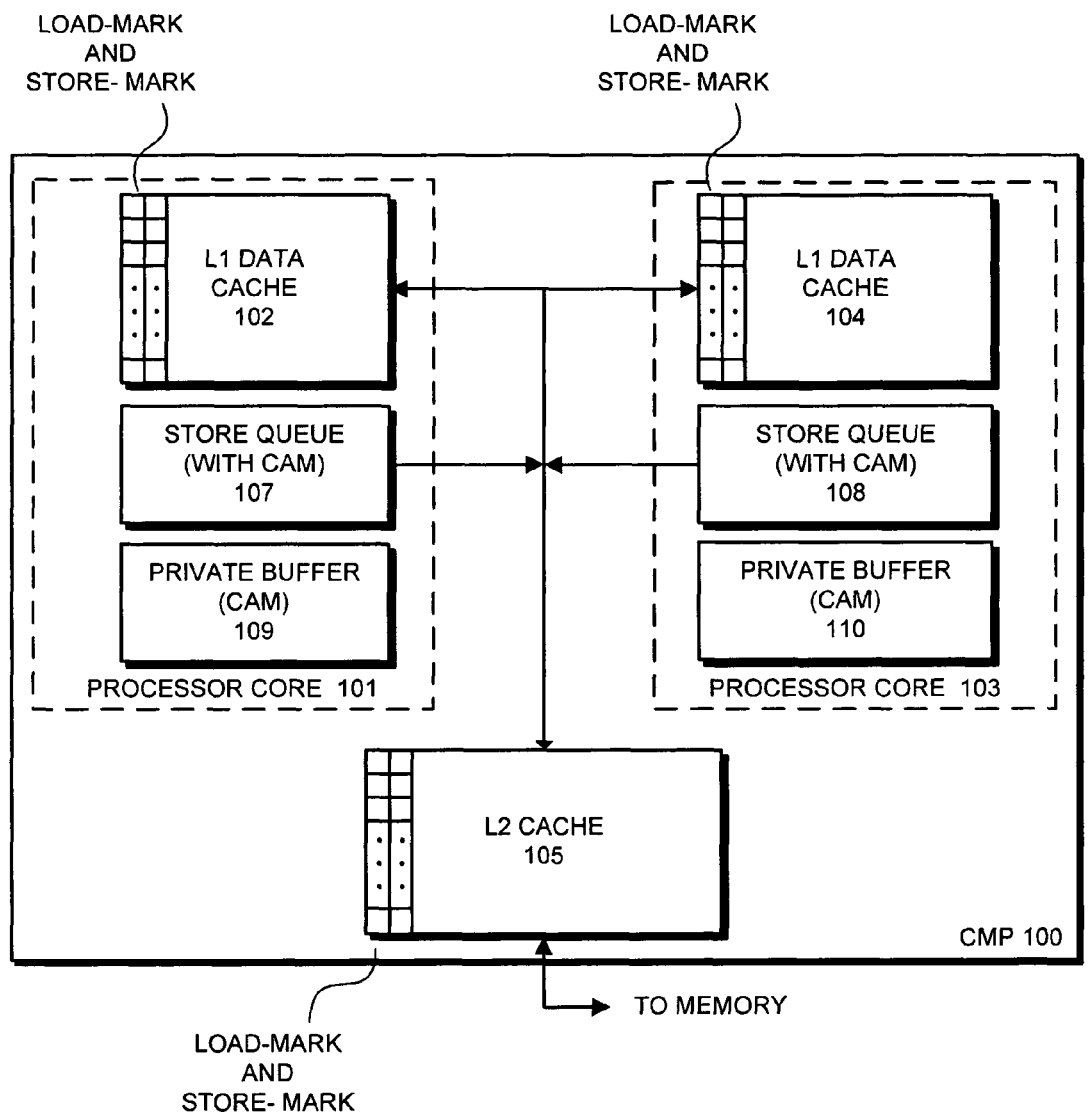
FIG. 1 illustrates an exemplary Chip Multi-Processor (CMP) system in accordance with an embodiment of the present invention.

FIG. 1 illustrates an exemplary Chip Multi-Processor (CMP) system 100 in accordance with an embodiment of the present invention. CMP system 100 is incorporated onto a single semiconductor die, and includes two processor cores, 101 and 103.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a miss in L1 data cache 102, processor core 101 creates an entry for the store in store queue 107 and sends a corresponding fetch for the store to L2 cache 105. If the lookup generates a hit in the L1 data cache 102, processor core 101 creates an entry for the store in store queue 107.

During a subsequent load operation, processor core 101 uses a CAM structure to perform a lookup in store queue 107 to locate completed but not-yet-retired stores to the same address that are logically earlier in program order. For each byte being read by the load operation, if such a corresponding store exists, the load operation obtains its value from store queue 107 rather than from the memory subsystem.

Processor cores 101 and 103 additionally include private buffers 109 and 110, which maintain copies of addresses of load-marked and store-marked cache lines to facilitate efficient lookups of these addresses. When a thread needs to load from or store to a cache line, that thread first checks its private buffer to determine if the thread has already load-marked or store-marked the cache line.

In addition, cache lines contained in L1 data caches 102 and 104, L2 cache 105, and in the memory (not shown) can include load-marks and store-marks in metadata associated with the cache line. When a cache line is load-marked by a thread, no other threads are permitted to store to the cache line, thereby preventing another thread from overwriting a value in the cache line. On the other hand, when a cache line is store-marked by a thread, the store-mark prevents another thread from loading the value from or storing a value to the cache line, thereby providing the store-marking thread with exclusive access to the cache line. We refer to the process of placing such marks on a cache line as either "load-marking" or "store-marking" the cache line. Both types of marking are described in more detail in the following sections of this disclosure.

Note that a load-mark prevents any other thread from writing to the cache line but not from reading from the cache line, so multiple threads can place load-marks in the metadata for a cache line (i.e., multiple threads can be reading from the cache line simultaneously). Hence, in one embodiment of the present invention, each cache line's metadata includes a "reader count" value that keeps track of how many threads have placed load-marks on the cache line. When multiple threads have load-marked the cache line, other threads are prevented from writing to the cache line until all of the threads have removed their load-marks.

In addition, when a thread has placed a load-mark on a cache line, the thread can perform any number of loads from the cache line. In other words, as long as a load-mark is set on the cache line, the marking thread may freely load the value from the cache line. The store-mark functions in the same way for stores to the cache line.

Load-Marking

The Load-Mark Request Operation

Figure 2A:
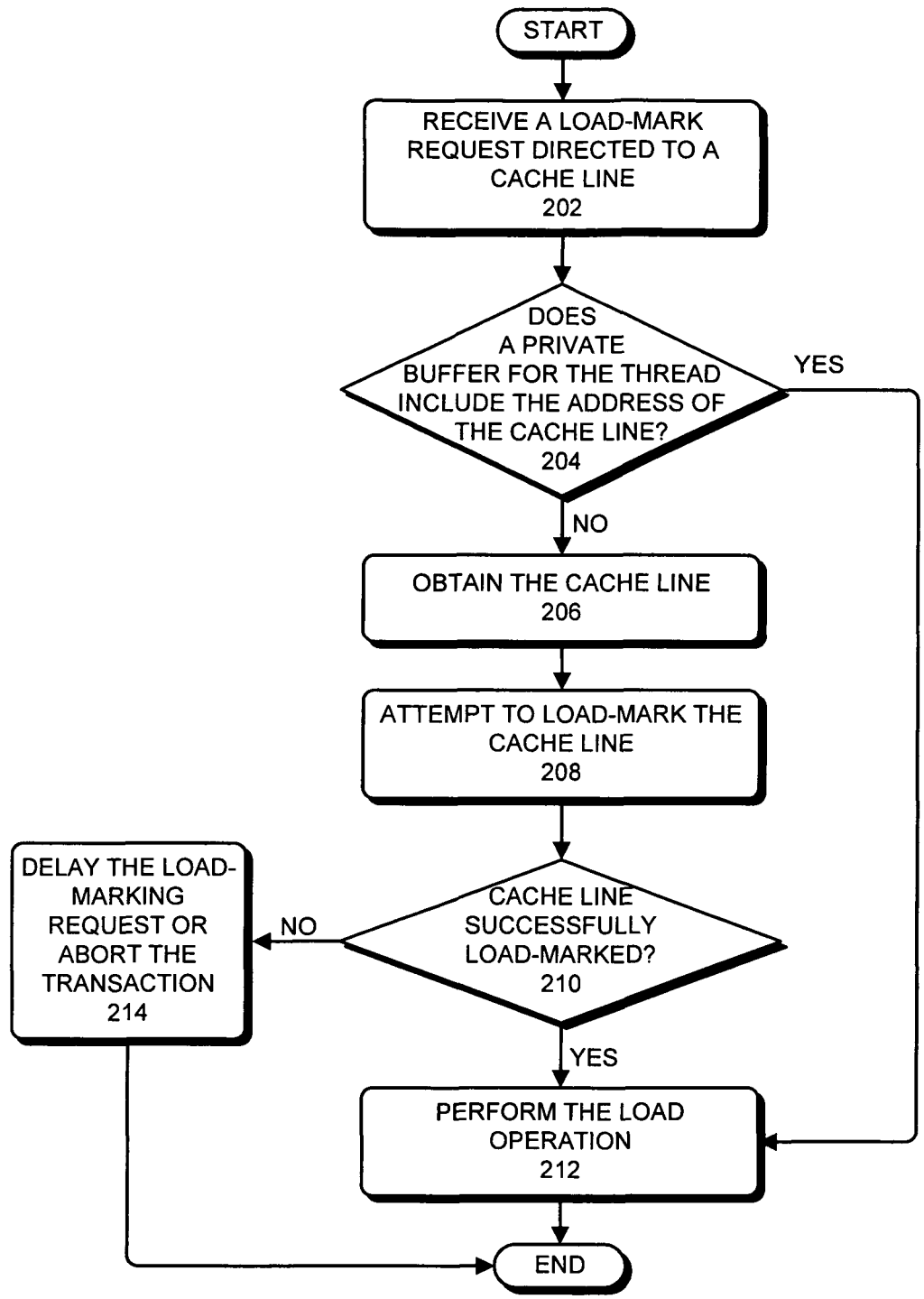
FIG. 2A presents a flowchart illustrating the process of performing a load-mark request operation in accordance with an embodiment of the present invention.

FIG. 2A presents a flowchart illustrating the process of performing a load-mark request operation in accordance with an embodiment of the present invention. Note that the load-mark request includes two operations; the load-marking operation and the load operation. When a load-mark request is handled, the system first attempts the load-marking operation. Upon successfully concluding the load-marking operation, the system automatically returns the cache line, thereby completing the load operation.

The process starts when the system receives a load-mark request from a thread, wherein the load-mark request is directed to a cache line (step 202). Next, the system checks a private buffer associated with the thread to determine whether the thread has already load-marked the cache line (step 204). Specifically, the system performs a lookup in the thread's private buffer based on the address of the load operation to locate a corresponding address for a load-marked cache line. If the private buffer contains a corresponding address, the thread has already load-marked the cache line and the thread can proceed with the load operation (step 212).

If the private buffer does not contain the corresponding address, the thread has not yet load-marked the cache line. In this case, the system then obtains the cache line (step 206) and attempts to load-mark the copy of the cache line in the local cache (step 208).

If load-marking is successful (step 210), the system performs the load operation (step 212). Otherwise, if the load-marking is unsuccessful, the system retries the load-mark request after a delay. In one embodiment of the present invention, the load-mark request is retried a predetermined number of times, and if the load-mark request remains unsuccessful, the transaction is aborted (step 214).

Figure 2B:
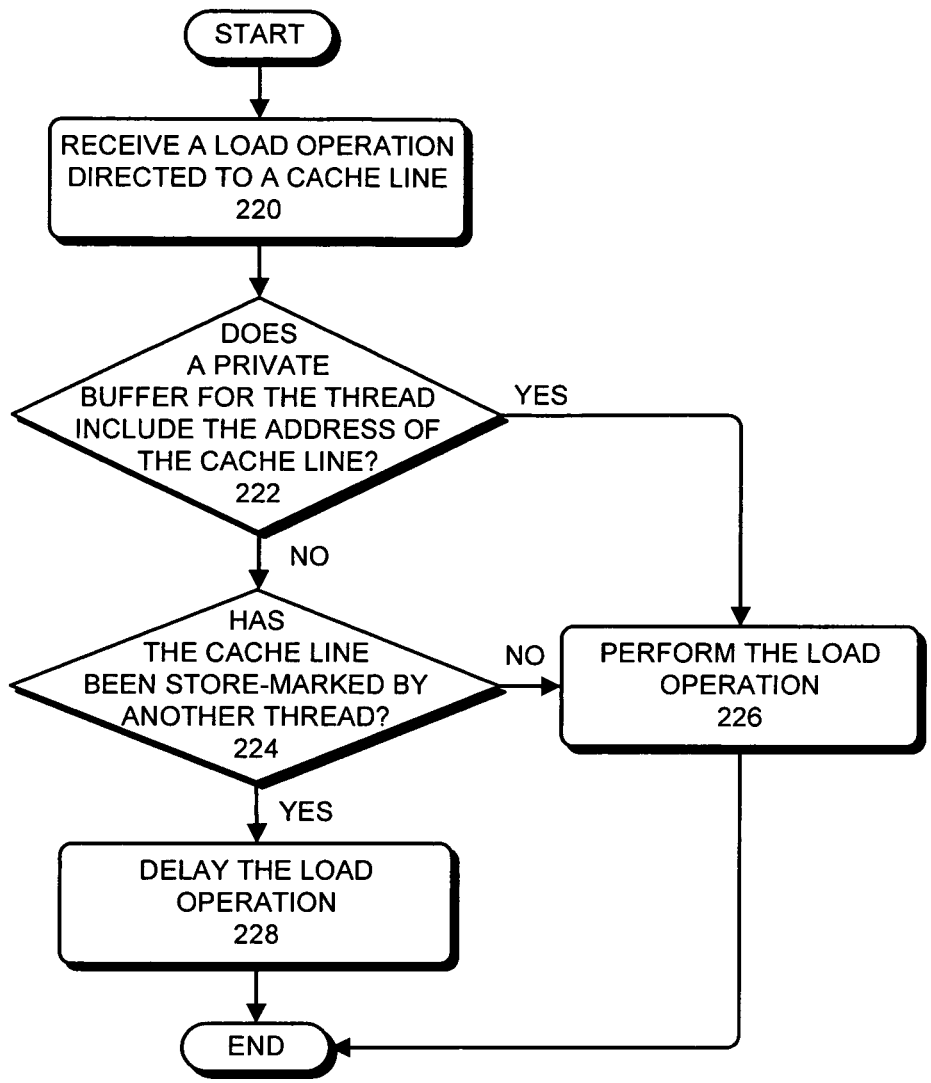
FIG. 2B presents a flowchart illustrating the process of performing a load operation without load-marking the cache line in accordance with an embodiment of the present invention.

FIG. 2B presents a flowchart illustrating the process of performing a load operation without load-marking the cache line in accordance with an embodiment of the present invention. The process starts when the system receives a load operation from a thread, wherein the load operation is directed to a cache line (step 220).

Next, the system checks a private buffer associated with the thread to determine whether the thread has already load-marked the cache line (step 222). Specifically, the system performs a lookup in the thread's private buffer based on the address of the load operation to locate a corresponding address for a load-marked cache line. If the private buffer contains a corresponding address, the thread has already load-marked the cache line and the system performs the load operation (step 226).

If cache line's address is not in the private buffer, the system determines if the cache line has been store-marked by another thread (step 224). If so, the thread cannot load the cache line and the load operation is retried after a delay (step 228). Otherwise, the system performs the load operation (step 226).

Attempting to Load-Mark the Cache Line

Figure 3:
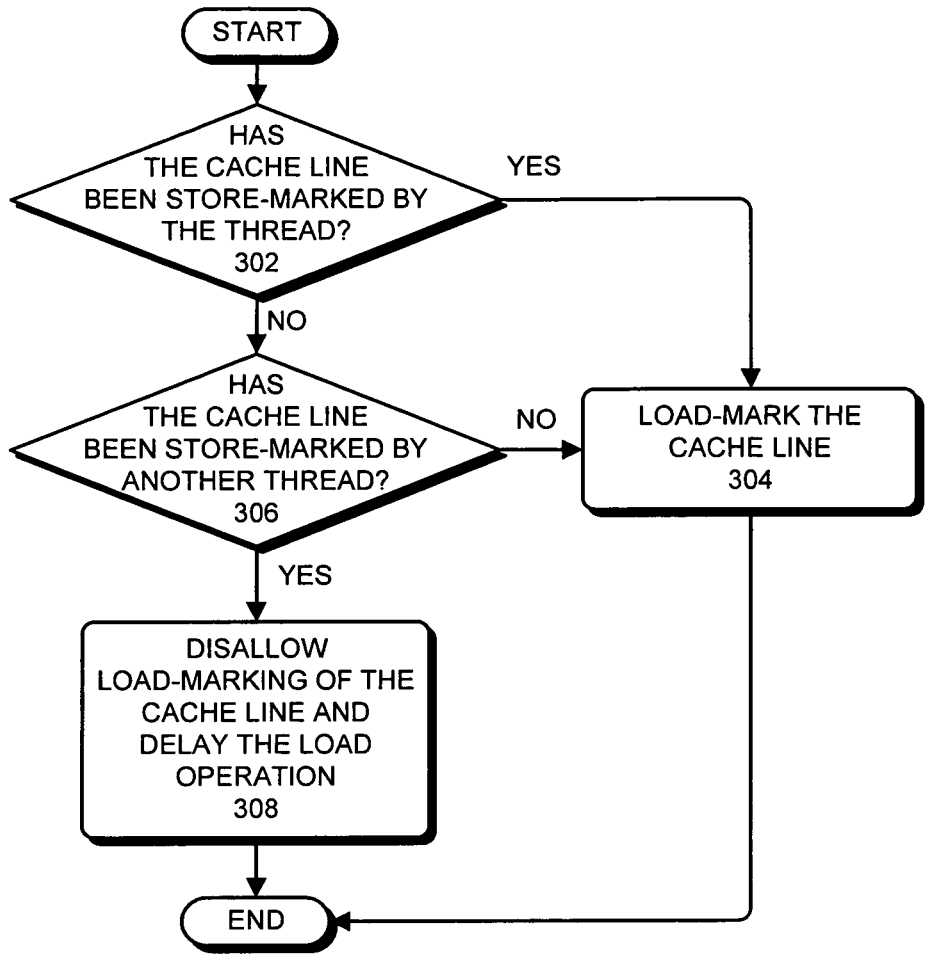
FIG. 3 presents a flowchart illustrating the process of attempting to load-mark the cache line in accordance with an embodiment of the present invention.

FIG. 3 presents a flowchart illustrating the process of attempting to load-mark the cache line in accordance with an embodiment of the present invention. During this process, the system first determines whether the cache line has been store-marked by the thread (step 302). Specifically, the system checks a store-mark buffer which maintains addresses of cache lines which have been store-marked by the thread to see if the address of the cache line exists in the store-mark buffer.

If the cache line has been store-marked by the thread, no other thread is permitted to load-mark the cache line (because of the exclusive property of store-marks). However, the thread may itself place a load-mark on a cache line that the thread has already store-marked. Hence, in this case, the system load-marks the cache line (step 304).

On the other hand, if the system determines that the cache line has not been store-marked by the thread, the system next determines if the cache line has been store-marked by another thread (step 306). If so, the thread cannot load-mark the cache line and the load operation is delayed (step 308). Otherwise, the system knows that the cache line has not been store-marked by any thread and the system proceeds to load-mark the cache line for the thread (step 304).

Figure 4:
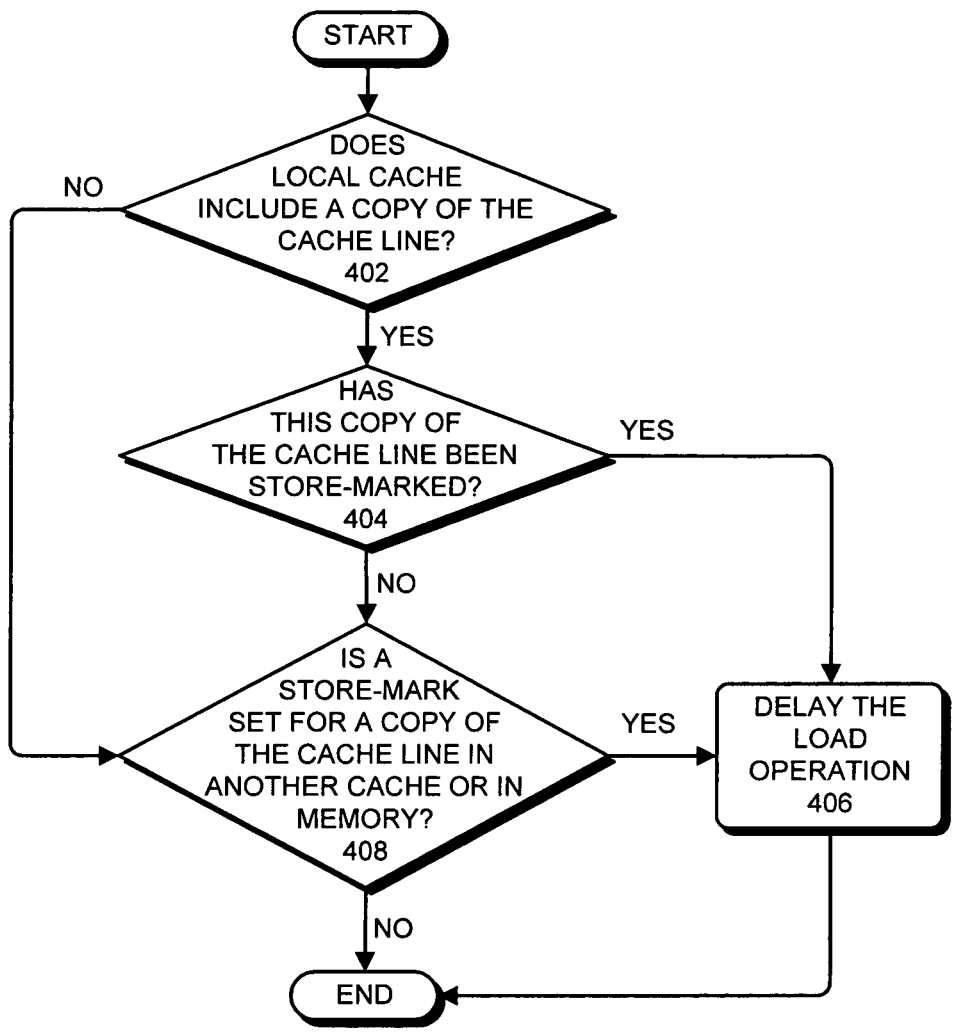
FIG. 4 presents a flowchart illustrating the process of determining whether the cache line has been store-marked by another thread in accordance with an embodiment of the present invention.

FIG. 4 presents a flowchart illustrating the process of determining whether the cache line has been store-marked by another thread in accordance with an embodiment of the present invention. During this process, system first checks in the thread's local cache for a copy of the cache line (step 402). If the system finds a copy of the cache line in the thread's local cache, the system examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in another cache or in memory (step 408). If so, the cache line has been store-marked by another thread, which means the cache line cannot be load-marked, and the load operation is delayed (step 406).

Store-Marking

The Store-Marking Operation

Figure 5A:
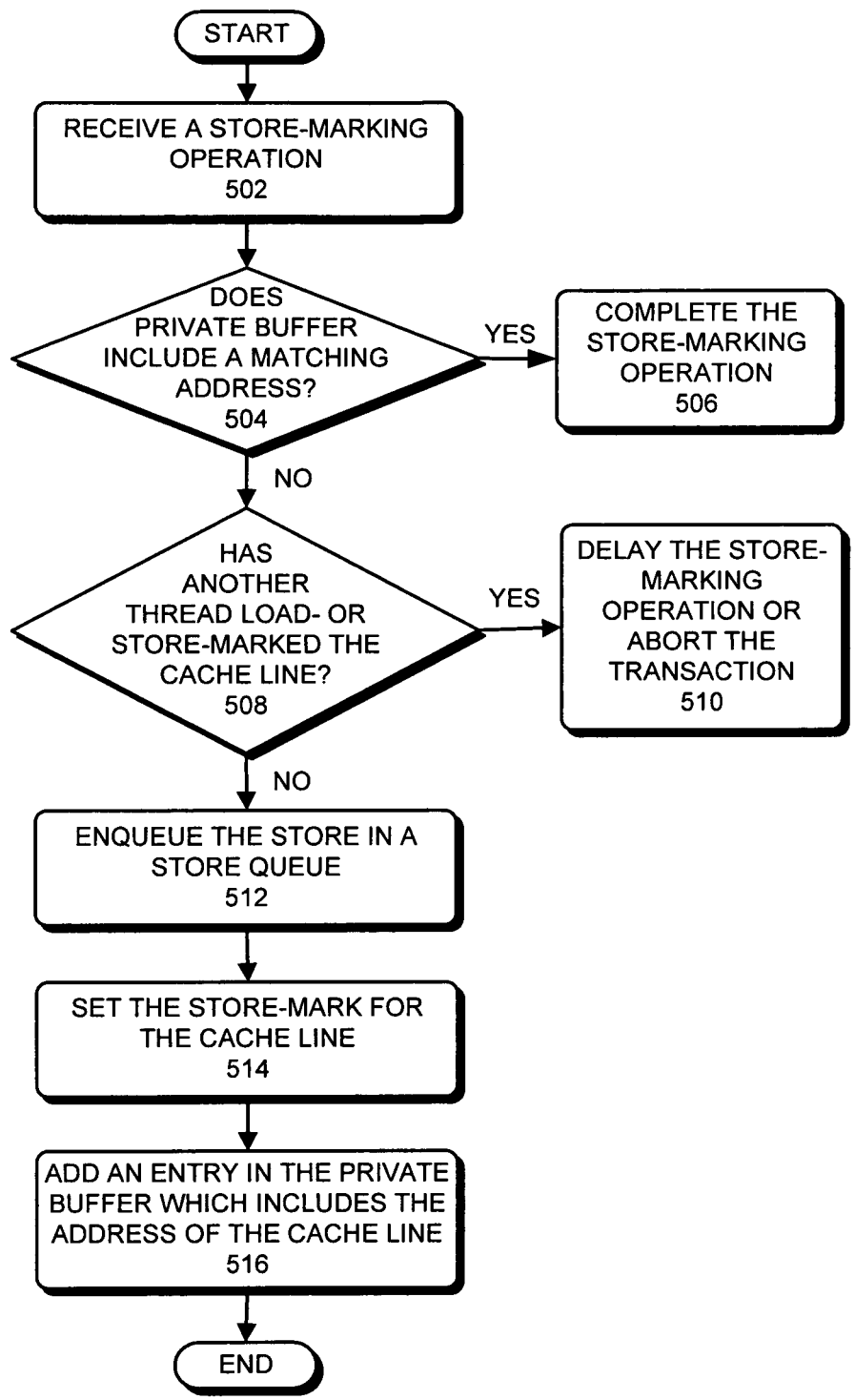
FIG. 5A presents a flowchart illustrating the process of performing a store-marking operation in accordance with an embodiment of the present invention.

FIG. 5A presents a flowchart illustrating the process of performing a store-marking operation in accordance with an embodiment of the present invention. The system first receives a store-marking operation which is directed to a cache line (step 502).

Next, the system checks the thread's private buffer 109 to determine whether the thread has already store-marked the cache line (step 504). Specifically, the system performs a lookup in the thread's private buffer based on the address of the memory reference to locate a corresponding address for a store-marked cache line. If the private buffer contains a corresponding address, the thread completes the store-marking operation (step 506).

If, however, the private buffer does not contain a matching address, the system determines whether the cache line has been store-marked or load-marked by another thread (step 508). During this process, system first checks in the thread's local cache for a copy of the cache line. If the system finds a copy of the cache line, the system examines the load-mark and store-mark to determine whether the cache line has been load-marked or store-marked by another thread. If the store-mark in the copy of the cache line is not set, the system determines whether the store-mark has been set in another copy of the cache line which exists in another cache or in memory. If a store-mark is set in either location, the store-marking operation is delayed and retried (step 510). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store-marking operation is delayed and retried (step 510). In one embodiment of the present invention, the store-marking operation is retried a predetermined number of times, and if the store-marking operation continues to be unsuccessful, the transaction is aborted (step 510).

Note that the system can use a cache-coherence mechanism to determine whether another cache or the memory holds a store-marked or load-marked copy of the cache line. This can involve sending an exclusive access request for the cache line to the other caches. If successful, the exclusive access request returns the cache line including store-mark status and the load-mark reader count. In one embodiment of the present invention, if the cache line has been store-marked in another cache, the system receives a NACK signal from the other cache which causes the request to fail, in which case the memory operation can be retried. In this embodiment, however, if the system does not receive a NACK signal, the system can then obtain exclusive (writable) access to that cache line.

Note that in order to perform a memory operation, it may be necessary to use the cache coherence protocol to obtain a copy of the cache line in a suitable state in the local cache. For example, if the memory operation is a load, it may be necessary to obtain a copy of the cache line in the shared (S), exclusive (E), owned (O), or modified (M) state. Similarly, if the memory operation is a store, it may be necessary to obtain a copy of the cache line in the E or M state (and if it is in the E state, it may be necessary to change it to the M state upon performing the store). If the cache coherence protocol is used to obtain a copy of the cache line in the E or M state, the request for this copy may differ from the exclusive access request mentioned in the preceding description. This is because the thread performing the store has already placed a store mark on the cache line, and thus the request should not receive a NACK signal.

If a store-mark or load-mark is not set in another cache or in memory, the system enqueues the store operation in store queue 107 (step 512). The system then sets the store-mark for the cache line (step 514) and adds the address of the cache line to the private buffer (step 516). Note that this entry remains in the private buffer until subsequent changes are made to the state of the cache line, such as removing the store-mark.

In one embodiment of the present invention, when a thread performs one or more stores to a store-marked cache line, the last of the stores can include a flag indicating that the store-mark should be cleared. When such a flag is encountered, the system releases the store-marked cache line by unsetting the store-mark in a copy of the cache line in its local cache, and additionally removing the address of the cache line from its private buffer.

In one embodiment of the present invention, a thread selectively places store-marks on cache lines. In other words, the thread may reorder some stores and not reorder other stores, in which case the thread store-marks on cache lines associated with stores that are reordered, but does not have to store-mark cache lines associated with stores that are not reordered and that are not part of a transaction.

Figure 5B:
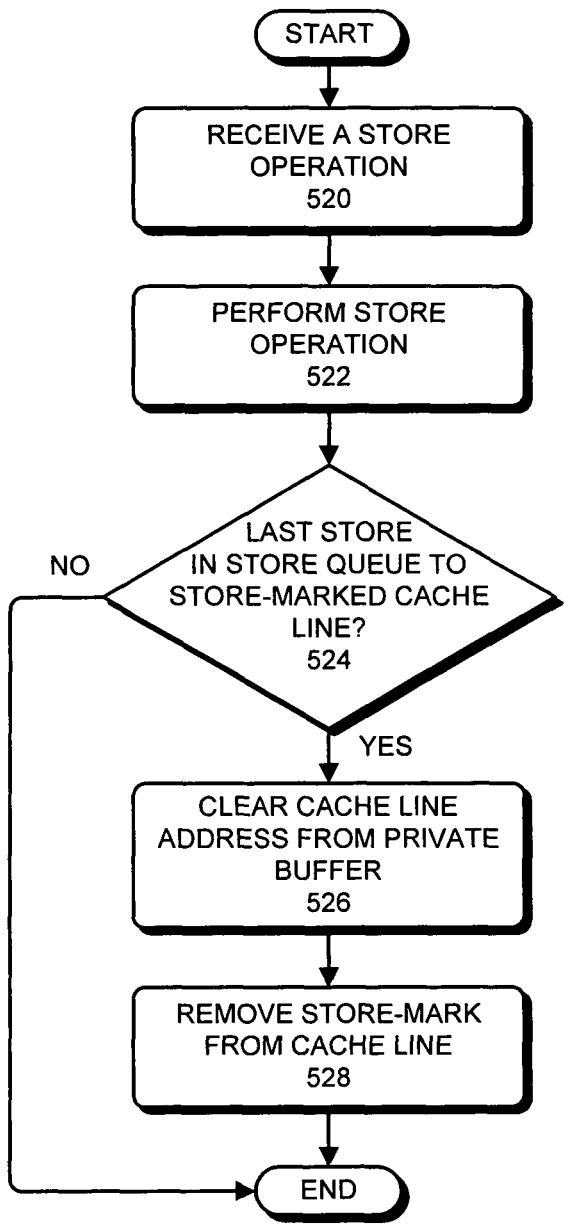
FIG. 5B presents a flowchart illustrating the process of performing a store operation for a cache line that has been store-marked in accordance with an embodiment of the present invention.

FIG. 5B presents a flowchart illustrating the process of performing a store operation for a cache line that has been store-marked in accordance with an embodiment of the present invention. The system first receives a store operation for a thread which is directed to a cache line from the store queue (step 520) and performs the store operation (step 522).

The system then determines if the store operation was the last store operation in the store queue to a store-marked cache line (step 524). If the store operation was the last store operation, the system clears the address of the store-marked cache line from the private buffer (step 526) and removes the store-mark from the cache line (step 528).

Figure 5C:
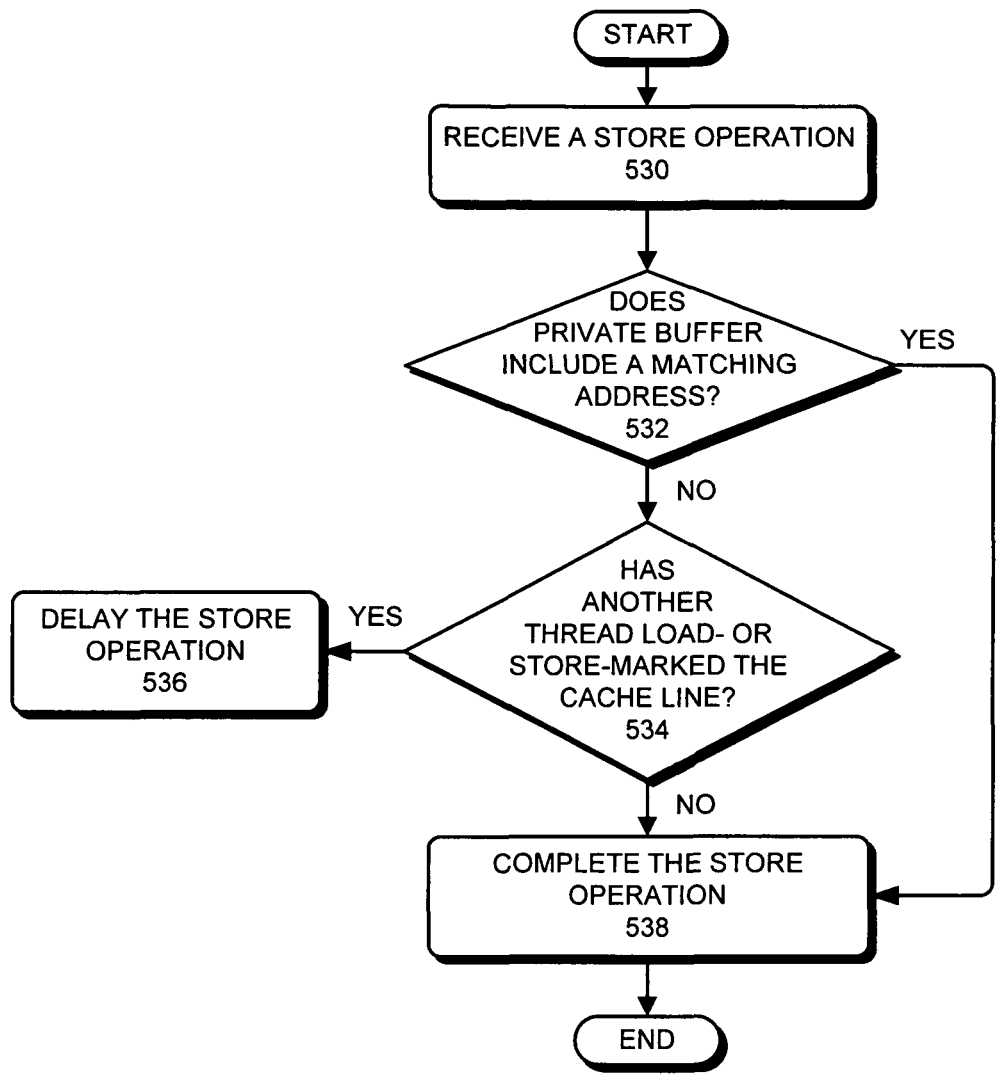
FIG. 5C presents a flowchart illustrating the process of performing, a store operation for a cache line that has not been store-marked in accordance with an embodiment of the present invention.

FIG. 5C presents a flowchart illustrating the process of performing a store operation for a cache line that has not been store-marked in accordance with an embodiment of the present invention. The system first receives a store operation for a thread from the store queue which is directed to a cache line (step 530). For the purposes of illustration, we assume that the store operation was the oldest store operation in the store queue and that the store operation has not been re-ordered with respect to other store operations.

Next, the system checks the thread's private buffer 109 to determine whether the thread has already store-marked the cache line (step 532). Specifically, the system performs a lookup in the thread's private buffer based on the address of the memory reference to locate a corresponding address for a store-marked cache line. If the private buffer contains a corresponding address, the thread proceeds with the store operation (step 538).

If, however, the private buffer does not contain a matching address, the thread concludes that it has not set the store-mark. If the thread has not set the store-mark, the system determines whether the cache line has been store-marked or load-marked by another thread (step 534). During this process, the system first checks in the thread's local cache for a copy of the cache line. If the system finds a copy of the cache line, it examines the store-mark to determine whether the cache line has been store-marked by another thread. If the store-mark in the copy of the cache line is not set, the system determines whether the store-mark has been set in another copy of the cache line which exists in another cache or in memory. If a store-mark is set in either location, the store operation is retried after a delay (step 536). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store operation is retried after a delay (step 536).

Propagating Store-Marks and Load-Marks

In one embodiment of the present invention, the system eventually propagates the load-marks and store-marks in the metadata for a cache line to the other caches and to memory. The following sections explain the process of propagating the load-marks and store-marks. Note that we refer to the combination of load-marks and store-marks together as "metadata" for cases where load-marks and store-marks are propagated in a similar way.

Note that obtaining a copy of the cache line in the proper coherency protocol state (as detailed in the following sections) is just the first step in reading from or writing to a cache line. After the cache line has been obtained in the proper coherency protocol state, the system has to verify that the desired access can be performed and, if necessary, add a load-mark or a store-mark before performing a read or write to the cache line.

Figure 6A:
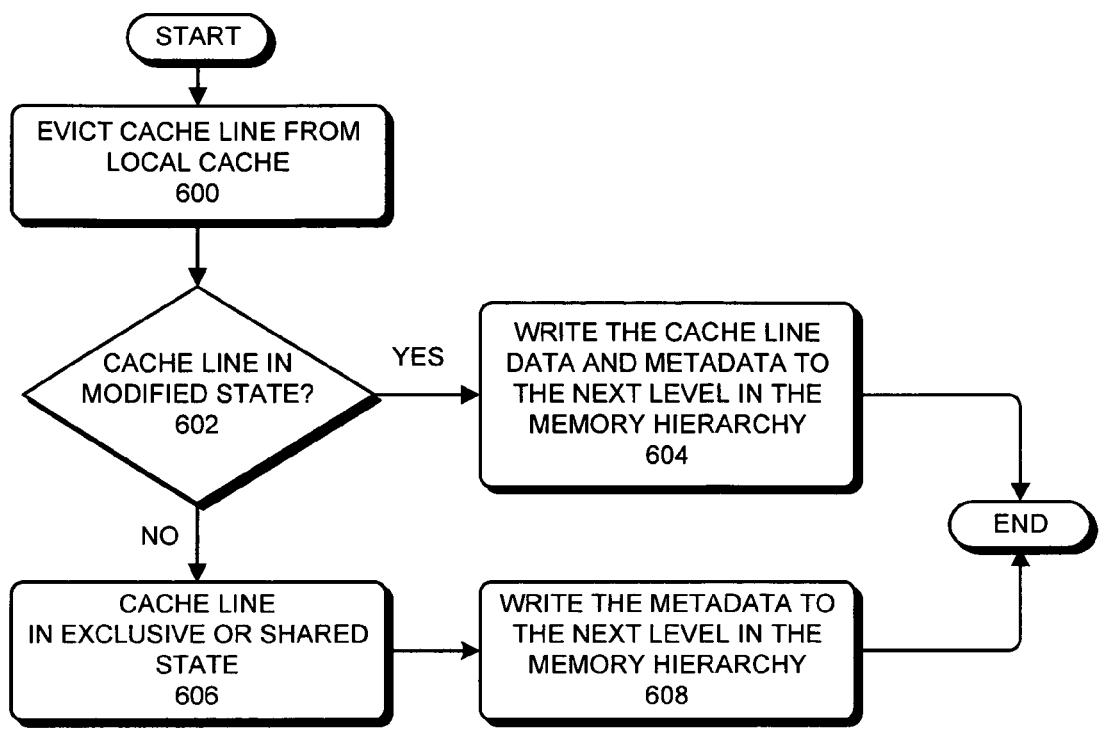
FIG. 6A presents a flowchart illustrating the process of propagating load-mark metadata for an evicted cache line in accordance with an embodiment of the present invention.

We first consider the case where a cache line is evicted from a cache as illustrated in FIG. 6A. The process starts when a cache line is evicted from a cache (step 600). The system determines if the cache line is in the modified state (step 602). If so, the system evicts the line by writing the cache line data and the metadata to the next level of the memory hierarchy (step 604).

On the other hand, if the cache line is not in the modified state, but is in the exclusive state or shared state (step 606), the system does not propagate the data in the cache line, but writes the metadata to the next level of the memory hierarchy (step 608).

Figure 6B:
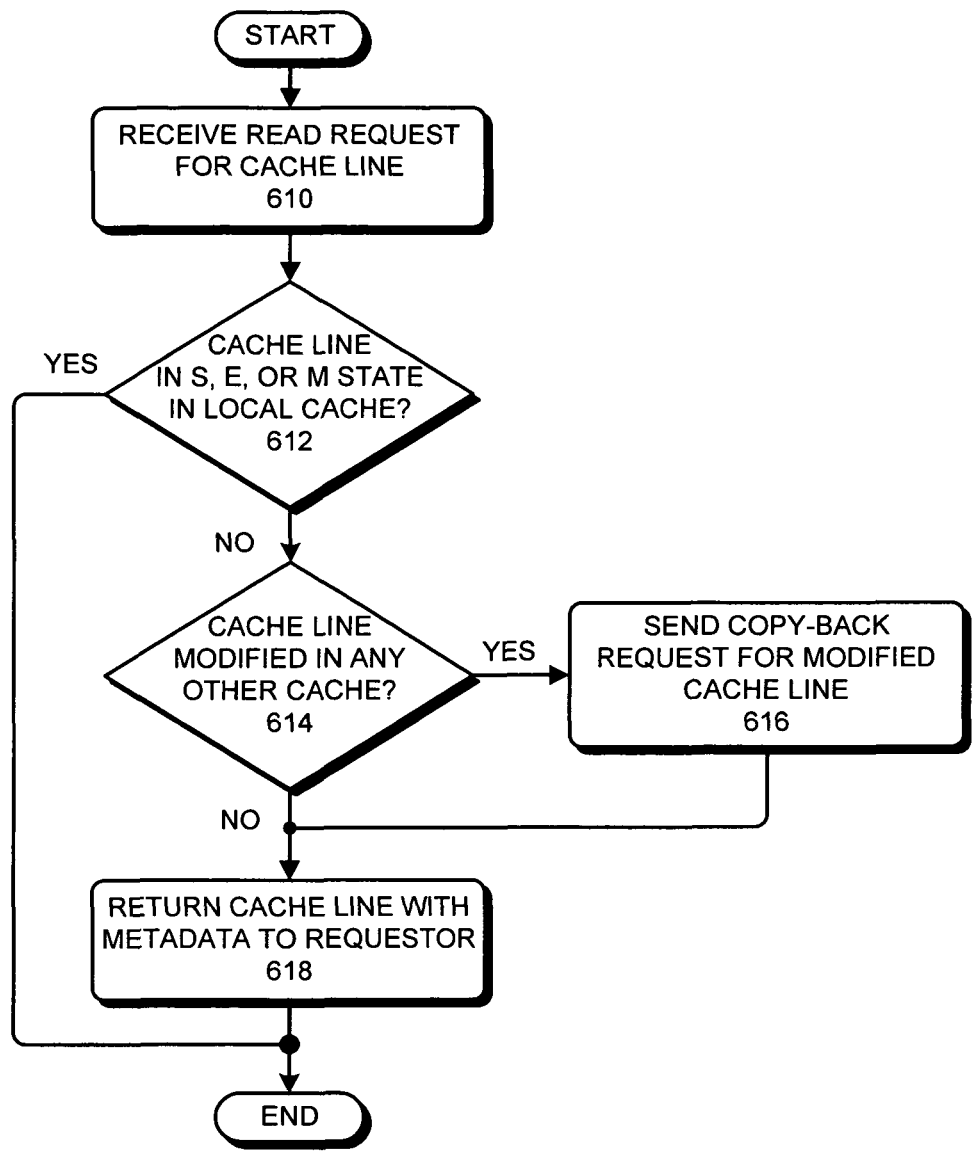
FIG. 6B presents a flowchart illustrating the process of propagating load-mark metadata for a cache line during a read operation in accordance with an embodiment of the present invention.

We next consider the case where the cache line is subject to a read operation as illustrated in FIG. 6B. The process starts when the system receives a read request for a cache line (step 610). The system first determines if the cache line is held the shared, exclusive, or modified state the thread's local cache (step 612). If so, the thread can read the local copy of the cache line and the process is complete.

Otherwise, the system determines if the cache line is held in any other processor's cache in the modified state (step 614). If so, the system sends a copyback coherence request to that cache (step 616). Upon receiving a copyback coherence request, the processor that holds the modified copy of the cache line responds with a copy of the cache line and the metadata, which are returned to the requestor (step 618). Note that when responding to the copyback coherence request, the processor that holds the modified copy responds with a copy of the cache line, but also retains a local copy of the cache line in the shared state.

When the processor sends the load-mark in response to a copyback coherence request, the processor can partition the reader count value into two parts and can send part of the reader count value and can retain part of the reader count value. However, the sum of the sent reader count value and the retained reader count value must equal the starting reader count value in the local copy of the cache line. For example, where the reader count value in the local copy of the cache line originally indicated that there were four load marks on the cache line, the processor can send two of the load marks with the sent line, while retaining two of the load marks in the local copy of the cache line.

Figure 6C:
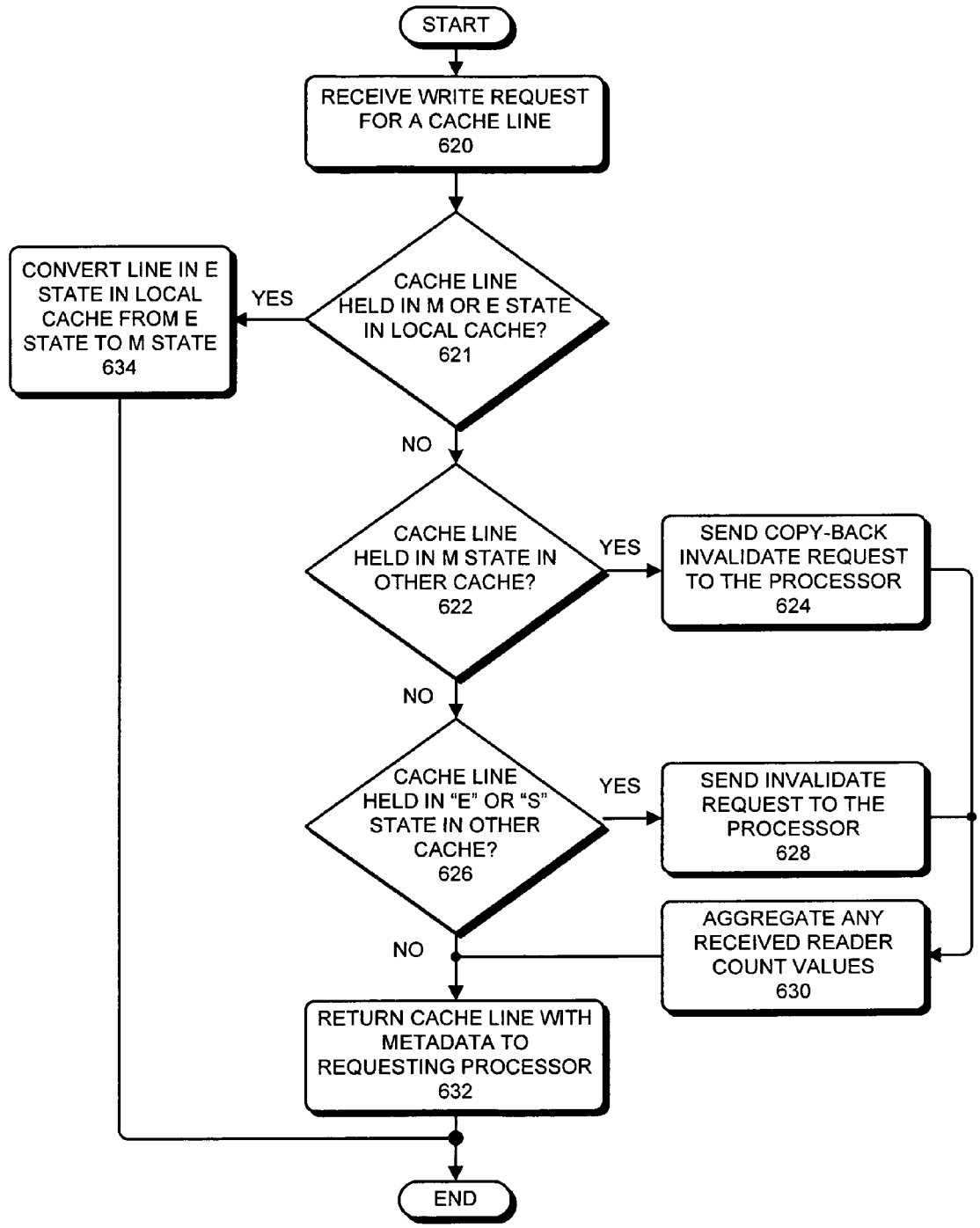
FIG. 6C presents a flowchart illustrating the process of propagating load-mark metadata for a cache line during a write operation in accordance with an embodiment of the present invention.

We next consider the case where the cache line is subject to a write request that is illustrated in FIG. 6C. Note that a thread attempting to write to the cache line first obtains a copy of the cache line in the modified state, which invalidates all copies of the line in other caches and obtains the cache line in the modified state for the requesting thread.

The process starts when the system receives a write request for a cache line (step 620). The system first determines if the cache line is held in the local cache in the modified or exclusive state (step 621). If the cache line is held in the modified state, the thread already has write access to the cache line, so the process is complete.

If the cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system. Hence, for one embodiment of the present invention, whenever a cache line is delivered to a local cache in the exclusive state, the cache line is delivered with reader count equal value to the total number of threads that have put load-marks on the cache line. In other words, when the cache line is delivered, the reader count value in the memory system is zero and all of the load-marks are included in the metadata for the local copy of the cache line. Note that the store-mark is propagated with each copy of the cache line, so no special treatment is required for the store-mark in this embodiment.

If the cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and metadata are propagated back to memory and the local copy of the given cache line in the given cache is invalidated.

On the other hand, if the system receives a write request for a cache line that is held in any other processor's cache in the exclusive state or the shared state (step 626), the system sends an invalidate coherence request to all other caches in the coherence domain that may contain a valid copy of the cache line (step 628). Upon receiving the invalidate coherence request at a given cache that holds the copy of the cache line, the metadata is propagated back to memory and the local copy of the cache line in the given cache is invalidated.

In addition, the system determines the number of load-marks that are on the copy of the cache line in memory. In one embodiment of the current invention, the system makes the determination by reading the metadata of the cache line in memory.

The system then sums load-marks in the metadata received from the other caches and from memory (step 630) and responds to the requester with a cache line, including the metadata (step 632). Hence, the copy of the line delivered to the requesting thread has a reader count value which is equal to the number of threads that have placed a load-mark on the line and a store-mark that is asserted if any other thread had asserted a local store-mark.

By propagating the metadata as described above, the system maintains the invariant that the sum of the load-marks in all valid copies of a cache line equals the total number of threads that have load-marked the line. Maintaining this invariant prevents a thread from storing to a line on which another thread has placed a load-mark.

Note that the system can use negative, as well as positive, values for reader count values. This can be helpful when a thread wants to remove a load-mark from a cache line that has been evicted from its local cache.

Transactions

Embodiments of the present invention implement transactions by maintaining a transaction state (including a "not-in-transaction" state and a "transaction-pending" state) for each thread and by buffering data from stores which occur during the transaction in the store queue. The system then either commits the transaction by performing the associated stores, or aborts the transaction by removing the associated stores from the store queue and restoring the pre-transactional state of the thread from a checkpoint generated at the start of the transaction.

The preceding sections of this disclosure describe how load-marks and store-marks can be placed on cache lines to allow an arbitrary number of reads and writes to be performed to those cache lines. The reads and writes can be placed in the memory order at any point from the placing of the corresponding load-mark or store-mark on the line to the clearing of that mark, regardless of when they were actually performed by the hardware.

Embodiments of the present invention use load-marks and store-marks to implement transactions by requiring that (1) the processor (or thread) places a load-mark on all lines read in a transaction, (2) the processor (or thread) places a store-mark on all lines written in the transaction, (3) these load-marks and store-marks are all held simultaneously when the transaction commits, (4) all loads that precede the transaction in program order are either committed prior to the transaction commit or have a load-mark on the cache line when the transaction commits, and (5) all stores that precede the transaction in program order are either committed prior to the transaction commit or have a store-mark on the cache line when the transaction commits. These rules guarantee that all reads and writes within the transaction can be placed (in program order) in the memory order when the transaction commits, without any intervening memory accesses from any other processors (or threads), thus preserving transactional semantics. Specifically, when the transaction commits, all earlier (in program order) loads for which load-marks are held are placed in the memory order, then all earlier (in program order) stores for which store-marks are held are placed in the memory order, then all loads and stores within the transaction are placed in the memory order.

Embodiments of the present invention use the same rules to implement atomic instructions (such as read-modify-write) by viewing the load and store portions of the atomic as forming a (very short) transaction. Note that the rules do not require stores which are earlier than the atomic instruction to commit to the memory system before the atomic instruction commits. Rather, such earlier stores can simply hold their store-marks when the atomic instruction commits. As a result, processing atomic instructions does not require draining the store queue. Furthermore, embodiments of the present invention use the same rules to facilitate processor hardware executing speculatively and out-of-order. In other words, for these embodiments, hardware speculative execution is also viewed as a transaction.

Executing a Transaction

Figure 7:
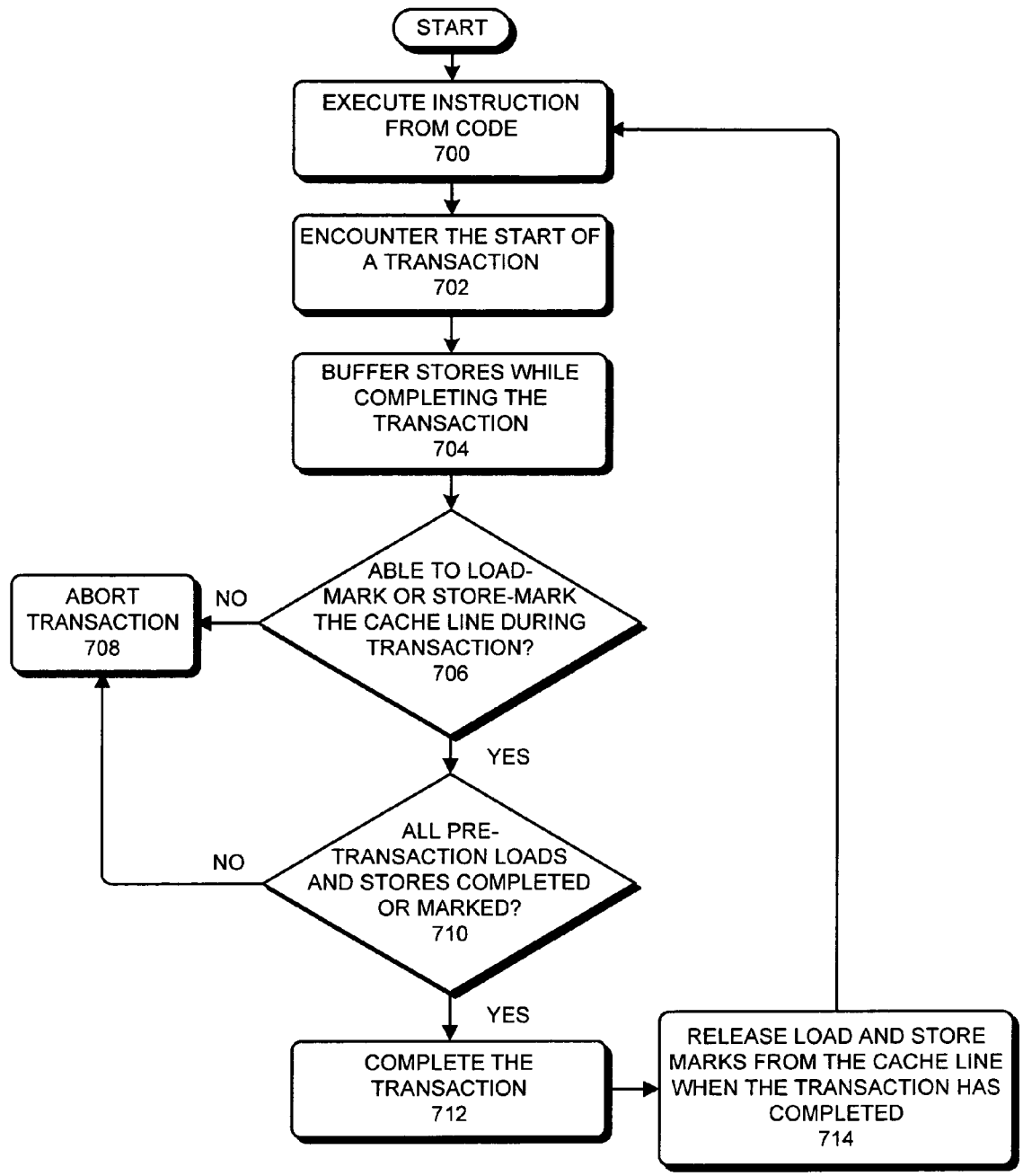
FIG. 7 presents a flow chart illustrating the process of performing a transaction in accordance with an embodiment of the present invention.

FIG. 7 presents a flow chart illustrating the process of performing a transaction in accordance with an embodiment of the present invention. The process starts with a thread executing instructions (step 700).

The thread then encounters the start of a transaction (step 702). For example, the transaction can be initiated by a start transactional execution ("STE") instruction, which puts the thread in transactional-execution mode. For a more detailed explanation of starting transactional execution see U.S. patent application Ser. No. 10/637,166, entitled "Start Transactional Execution (STE) Instruction to Support Transactional Program Execution," by inventors Marc Tremblay, Quinn A. Jacobson and Shailender Chaudhry, filed on 8 Aug. 2003, which is hereby incorporated by reference to explain the process of starting transactional execution. Alternatively a transaction can be defined to be an atomic operation, in which case the start of the transaction can be indicated by an atomic instruction, such as a read-modify-write instruction. Furthermore, a transaction can be defined as hardware speculative execution, in which case the start of the transaction can be indicated by the entry to the hardware speculative execution episode.

Upon entering the transaction, the system switches the transaction state indicator to "transaction pending," takes a checkpoint of the architectural state of the strand, and commences buffering of store operations encountered during the transaction (step 704).

During the transaction, the thread attempts to place a load-mark on all cache lines read by the thread and a store-mark on all cache lines written by the thread (step 706). If the thread is unable to place a mark on a cache line, the transaction aborts (step 708). For example, if the transaction attempts to place a store-mark on a cache line that has already been load-marked or store-marked by another thread, the thread is unable to place the store-mark and the transaction aborts and the system restores the architectural state that was checkpointed at the start of the transaction.

Note that in order to protect marked cache lines from subsequent memory operations by other threads during the transaction, all load-marks and store-marks placed on cache lines during the transaction remain on the cache line until the transaction commits. In other words, the marking thread simultaneously holds all the load-marks and store-marks placed during the transaction when the transaction commits.

When the transaction has completed (as indicated by the completion of the atomic instruction, the return to non-speculative execution after a hardware speculative execution episode, or by the commit instruction at the end of transactional execution), the system prepares to commit the results of the transaction. Before committing the results of transactional execution, the system determines whether all loads that precede the transaction in program order have either been committed or have a read mark on a corresponding cache line. The system also determines whether all stores that precede the transaction in program order are either committed to memory prior to the transaction commit or have a write mark on a corresponding cache line (step 710). If not, the transaction aborts (step 708).

Otherwise, because the pre-transaction loads and stores either commit before the transaction or hold a load-mark or store-mark on an associated cache line, all reads and writes within the transaction can be committed when the transaction completes without any intervening memory accesses from any other thread. In this case, the system commits the results of the transaction by completing the stores buffered during the transaction (step 712).

After committing the results of the transaction, the thread releases any load-marks and store-marks from any cache lines that were accessed during the transaction and returns the transaction state indicator to the "not-in-transaction" state (step 714). The system then returns to step 700 and continues to execute instructions from the program code.

The foregoing descriptions of embodiments of the present invention have been presented only for purposes of illustration and description.

They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating efficient transactional execution, comprising:

executing a transaction for a thread, wherein executing the transaction involves placing load-marks on cache lines which are loaded during the transaction and placing store-marks on cache lines which are stored to during the transaction;

wherein executing the transaction involves speculatively executing a critical section of code within a program, and, upon finishing executing the critical section without encountering an interfering data access from another process, completing the transaction by:

placing a load-mark on any outstanding loads that precede the transaction in program order;

placing a store-mark on any outstanding stores that precede the transaction in program order; and committing changes made during the speculative execution; and resuming normal non-speculative execution of the program;

upon completing the transaction, releasing the load-marks and the store-marks from the cache lines which were load-marked and store-marked during the transaction; and wherein the load-marks and store-marks prevent interfering accesses from other threads to the cache lines during the transaction.

2. The method of claim 1, wherein a transaction can include a section of program code, an atomic instruction, or an episode of hardware speculative execution.

3. The method of claim 2,
wherein when an interfering data access from another thread is encountered during execution of the critical section, discarding changes made during the speculative execution and attempting to re-execute the critical section zero or more times.

4. The method of claim 3, wherein executing the transaction involves gating a store queue for the thread, so that the store queue does not send out stores generated during the transaction.

5. The method of claim 4, wherein committing changes made during the speculative execution involves committing store queue entries generated during the transaction to memory.

6. The method of claim 4, wherein prior to allowing the thread to speculatively execute the critical section, the method further comprises performing a checkpointing operation to checkpoint register values and other state information associated with the thread.

7. The method of claim 1, wherein aborting the transaction involves:
releasing load-marks and store-marks from cache lines;
removing store queue entries generated during the transaction; and
restoring a pre-transactional state from the checkpoint generated as the transaction commenced.

8. The method of claim 7, wherein when a cache line is load-marked, no other thread may store a value in the cache line and when a cache line is store-marked, no other thread may load or store a value in the cache line.

9. The method of claim 1, wherein the transaction is aborted if the load-mark or the store-mark cannot be placed on the cache line during the transaction.

10. An apparatus that facilitates efficient transactional execution, comprising:
a processor;
an execution mechanism on the processor;
wherein the execution mechanism is configured to execute a transaction for a thread, wherein while executing the transaction, the execution mechanism is configured to place load-marks on cache lines which are loaded during the transaction and to place store-marks on cache lines which are stored to during the transaction, and
wherein when executing the transaction, the execution mechanism is configured to speculatively execute a critical section of code within a program, and, upon finishing executing the critical section without encountering an interfering data access from another process, the execution mechanism is configured to complete the transaction by:
placing a load-mark on any outstanding loads that precede the transaction in program order;
placing a store-mark on any outstanding stores that precede the transaction in program order;
committing changes made during the speculative execution and resume normal non-speculative execution of the program; and
upon completing the transaction, the execution mechanism is configured to release the load-marks and the store-marks from the cache lines which were load-marked and store-marked during the transaction.

11. The apparatus of claim 10, wherein a transaction can include a section of program code, an atomic instruction, or an episode of hardware speculative execution.

12. The apparatus of claim 11,
wherein when an interfering data access from another thread is encountered during execution of the critical section, the execution mechanism is configured to discard changes made during the speculative execution and to attempt to re-execute the critical section zero or more times.

13. The apparatus of claim 12, wherein while executing the transaction, the execution mechanism is configured to gate a store queue for the thread, so that the store queue does not send out stores generated during the transaction.

14. The apparatus of claim 13, wherein while committing changes made during the speculative execution the execution mechanism is configured to commit store queue entries generated during the transaction to memory.

15. The apparatus of claim 13, further comprising a checkpointing mechanism, wherein the checkpointing mechanism is configured to perform a checkpointing operation to checkpoint register values and other state information associated with the thread prior to the thread speculatively executing the critical section.

16. The apparatus of claim 10, wherein while aborting the transaction, the execution mechanism is configured to release load-marks and store-marks from cache lines; remove store queue entries generated during the transaction; and restore a pre-transactional state from the checkpoint generated as the transaction commenced.

17. The apparatus of claim 16, wherein when a cache line is load-marked, no other thread may store a value in the cache line and when a cache line is store-marked, no other thread may load or store a value in the cache line.

18. The apparatus of claim 10, wherein the execution mechanism is further configured to abort the transaction if the load-mark or the store-mark cannot be placed on the cache line during the transaction.

19. A computer system that facilitates efficient transactional execution, comprising:
a processor;
a memory coupled to the processor, wherein the memory is configured to store data and instructions for the processor;
an execution mechanism on the processor;
wherein the execution mechanism is configured to execute a transaction for a thread, wherein while executing the transaction, the execution mechanism is configured to place load-marks on cache lines which are loaded during the transaction and to place store-marks on cache lines which are stored to during the transaction, and
wherein when executing the transaction, the execution mechanism is configured to speculatively execute a critical section of code within a program, and, upon finishing executing the critical section without encountering an interfering data access from another process, the execution mechanism is configured to complete the transaction by:
placing a load-mark on any outstanding loads that precede the transaction in program order;
placing a store-mark on any outstanding stores that precede the transaction in program order; and
committing changes made during the speculative execution and resume normal non-speculative execution of the program; and
upon completing the transaction, the execution mechanism is configured to release the load-marks and the store-marks from the cache lines which were load-marked and store-marked during the transaction.

20. The computer system of claim 19, wherein the execution mechanism is further configured to abort the transaction if the load-mark or the store-mark cannot be placed on the cache line during the transaction.

* * * * *